3,538,029
VINYLIDENE CHLORIDE COPOLYMER COATING FOR ORGANIC FILM
Anthony Edward Gross, Richmond, Va., assignor to E. I. du Pont de Nemours and Company, Wilmington, Del., a corporation of Delaware
No Drawing. Filed Nov. 21, 1967, Ser. No. 684,644
Int. Cl. B44d 1/24; C08f 29/14; C09d 7/02
U.S. Cl. 260—23 2 Claims

ABSTRACT OF THE DISCLOSURE

A heat-sealable coating composition for organic film, e.g., regenerated cellulose film, comprising as the essential ingredients in a volatile organic solvent (1) 100 parts by weight of a copolymer of vinylidene chloride and at least one ethylenically unsaturated monomer copolymerizable therewith, said copolymer containing at least 87% by weight of vinylidene chloride; (2) from 0.5 to 3.0 parts by weight of a diamide having the formula $$R(NHCO-R_1)_2$$

where R is a divalent radical selected from the group consisting of methylene and ethylene, and $R_1$ is a monovalent radical selected from the group of alkyl and alkenyl radicals having from 10 to 22 carbon atoms; (3) from 0.5 to 3.0 parts by weight of a paraffin hydrocarbon wax having a melting point above 55° C., and (4) from 0.2 to 2.0 part by weight of a solid particulate material having a particle size within the range of 0.5 to 10 microns. Optionally, the composition may include, as a release agent from 0.5 to 2.0 parts by weight of an alkali metal stearate.

---

It is now conventional practice to provide organic films to be used as wrapping tissue with a continuous heat-sealable, vinylidene chloride copolymer coating. However, where film coated with available vinylidene chloride copolymer coating compositions is to be laminated to another material through the ageny of a solvent adhesive, with the coating serving as an intermediate lamina, the resulting laminate has an unattractive mottled appearance which greatly limits its acceptance as a wrapping material. In other specific application, viz., that of wrapping cheese, and, in particular in applications wherein individual slices of cheese are wrapped in film, there is a tendency for the cheese slice to adhere to the film wrapping, making it difficult to remove the indivdiual wrapping without disrupting the surface of the cheese slice. Also, the individual slice packs tend to stick together or block on storage.

These difficulties are substantially obviated by the present invention which, briefly stated, comprises a coating composition to be used on organic film substrates and particularly regenerated cellulose film, comprising essentially, in a volatile organic solvent, (1) 100 parts by weight of a copolymer of vinylidene chloride and at least one other ethylenically unsaturated monomer copolymerizable therewith, the copolymer containing at least 87% by weight of vinylidene chloride; (2) from 0.5 to 3.0 parts by weight of a diamide having the formula $$R(NHCO-R_1)_2$$

where R is an alkylene radical selected from the group consisting of methylene and ethylene radicals, and $R_1$ is a monovalent radical selected from the group consisting of alkyl and alkenyl radicals having from 10 ot 22 carbon atoms, (3) from 0.5 to 3.0 parts by weight of a paraffin hydrocarbon wax having a melting point about 55° C.; and (4) from 0.2 to 1.0 part by weight of a solid particulate material having a particle size in the range of 0.5 to 10 microns. Where the coated film is to be used in adhesive lamination the coating composition preferably contains, in addition to the essential ingredients specified hereinabove, from 0.5 to 2.0 parts by weight of a stearate salt of an alkali metal, for example sodium stearate.

The coating solutions are made up following conventional procedures for making coating baths of high polymeric materials. The solids content of the coating bath is usually in the order of 10 to 25%. The coating solution can be made, for example, by charging the vinylidene chloride copolymer, the high melting diamide, the paraffin wax and the particulate material in the required amount of solvent, preferably a mixture consisting of tetrahydrofuran and toluene in the weight ratio range of from 60/40 to 70/30, and the entire ingredients are agitated in an appropriate vessel at 40° C. until the solution of the soluble ingredients is complete. Alternately, the various soluble ingredients can be dissolved in ether the tetrahydrofuran solvent or the toluene solvent and the resulting solutions contaning the various ingredients can then be mixed together along with the particulate to give the desired coating solution. The coating solutions thus prepared can be applied by conventional coating methods to the appropriate base sheet. A typical base sheet, for example, would be a regenerated cellulose film containing about 15% glycerol or alternate softening agent and in the order of 0.4% by weight of a melamine/formaldehyde resin.

While the composition of this invention has its principal application in the production of regenerated cellulose film, and will be described hereinafter with specific reference to such film, it is to be understood that other organic films heretofore employed as substrates for vinylidene chloride copolymer coatings are similarly useful herein. These include films of methyl cellulose, ethyl cellulose, hydroxy ethyl cellulose, hydroxy propyl cellulose, polyvinyl alcohol, partially hydrolyzed ethylene/vinyl acetate copolymers, polyolefins such as polyethylene and polypropylene, polyesters, polyamides, polyvinyl chloride, polystyrene, polyvinyl fluoride, etc.

In general, the vinylidene chloride content of the vinyl- ident chloride copolymers used herein should be at least 87% by weight. Ethylenically unsaturated monomers that can be copolymerized with vinylidene chloride to produce suitable coating compositions include those described in U.S. Pat. 3,179,532. Specific copolymers include vinylidene chloride/acrylonitrile copolymer of weight ratio 90.5/9.5; vinylidene chloride/acrylonitrile/itaconic acid copolymer in weight ratio 90.5/9/0.5, vinylidene chloride/methyl methacrylate/itaconic acid copolymer in weight ratio 90/9.5/0.4 and vinylidene chloride/acrylontrile/methyl methacrylate/itaconic acid in weight ratio 91.5/6/2/0.5.

Representative of the diamides useful herein are ethylene bis-oleamide, ethylene bis-erucamide, ethylene bis-stearamide, methylene bis-stearamide, methylene bis-oleamide, ethylene bis-lauramide, ethylene bis-myristamide and methylene bis-palmitamide. If less than 0.5 part by weight of diamide based on 100 parts of copolymer, is contained in the coating composition the advantages herein described will not be realized. Amounts of diamide in excess of 3.0 part by weight tend to cause incompatability of the paraffin wax in the coating, giving rise to poor film appearance. Best results are obtained when the diamide and the paraffin wax are used in approximately equal amounts.

For adhesive lamination the wax constituent of the coating composition should be a paraffin hydrocarbon wax having a melting point of at least 55° C. For cheese wrapping the wax should have a melting point of at least 80° C. to prevent sticking of the film to the cheese surface. As specified hereinabove the paraffin hydrocarbon wax should be used in amounts within the range of from 0.5 to 3.0 parts by weight based upon 100 parts by weight of vinylidene chloride copolymer. At a wax level below 0.5 acceptable appearance is not realized in adhesive lamination and sticking of the film to the cheese surface is not avoided. At levels above 3.0, acceptable package appearance is not realized in either adhesive lamination or in cheese wrapping because of excessive blush at the film surface.

The particulate material serves the purpose of improving the anti-blocking properties of the film and improves the film to film slip. The particulate used should be insoluble in the coating and in the coating solvents. Suitable materials include, for example, talc in amounts of 0.2 to 1.0 part, bentonite clay in amounts of 0.05 to 0.2 and mica in amounts between 0.5 to 2.0 parts by weight, in all cases, based on 100 parts by weight of vinylidene chloride copolymer. An especially preferred paticulate material is steatite talc used in amounts of 0.2 to 0.5 part by weight. The particle size of the particulate material should be within the range of from 0.5 to 10 microns.

The following examples are illustrative of preferred embodiments of my invention. Parts are by weight.

EXAMPLE 1

A coating lacquer is made by dissolving 100 parts of a vinylidene chloride copolymer consisting of 91.5 parts vinylidene chloride, 6 parts acrylonitrile, 2 parts methyl methacrylate and 0.5 part itaconic acid, 2.5 parts of ethylene bis-oleamide, 2.5 parts of a microcrystalline wax (Multiwax 195 M (M.P. 88° C.)—Petroleum Specialties, Inc.), 0.43 part of seatite talc (Mistron HGO–55—Sierra Talc & Clay Co.), in a 65/35 mixture of 274 parts of tetrahydrofuran and 148 parts of toluene. The vinylidene chloride copolymer is slurried in about 74 parts of toluene to which the tetrahydrofuran is added after about 30 minutes and the resulting mixture is stirred at 40° C. until solution is complete. To this is added a solution of the three other ingredients in the remainder of the toluene and the combined mixture is stirred at 40° C. for about an hour.

This lacquer is coated on a regenerated celluose film base containing about 18% by weight of glycerol and 0.4% of a modified melamine/formaldehyde anchoring resin. A strip of the resulting film, bearing about 3 grams per square meter of coating, is placed on a flat surface and molten cheese at approximately 70° C. is deposited on the film in a lane extending the length of the strip. The remaining lanes of the film are folded over to enclose the deposited cheese and after cooling to room temperature the strip is cut into segments of individually wrapped cheese portions. The individual packets slip readily over and past each other for easy packing into a container and the wrapping on the individual packets can be removed without sticking to the cheese or disrupting its surface. A regenerated cellulose film (control A) coated with a lacquer similar to that described above except that the microcrystalline wax is omitted from the formula shows poor surface slip. Individual packets do not slip readily over and past each other giving rise to poor packing efficiency.

Another control film (B) made as described above from the same vinylidene chloride copolymer but with 5 parts of refined candelilla wax, 0.5 part of the glyceryl ester of maleic anhydride treated resin, 2 parts of calcium stearate and 0.4 part of pulverized talc could not be unwrapped from the contained cheese without disrupting the cheese surface and carrying a considerable layer of the cheese with the removed wrap.

Results substantially the same as those described above for the test and control films are obtained when the vinylidene chloride copolymer comprises vinylidene chloride/acrylontrile (90.5/9.5) and vinylidene chloride/acrylonitrile/itaconic acid (90.5/9.0/0.5) or vinylidene chloride/methyl acrylate/itaconic acid (90/9.5/0.5).

EXAMPLE 2

Following the procedure outlined in Example 1 a coating lacquer is made by dissolving 100 parts of a vinylidene chloride/acrylonitrile/methyl methacrylate/itaconic acid (90.5/6/2/0.5) copolymer, one part of ethylene bis-oleamide, one part sodium stearate, one part of paraffin hydrocarbon wax (Aristowax 143–150; Petroleum Specialties Inc.) having a melting point in the range of 62 to 65° C., one 0.43 part of steatite talc (Mistron HGO–55) in a 60/40 mixture of 253 parts of tetrahydrofuran and 169 parts of toluene. The lacquer is coated on a regenerated cellulose film, as in Example 1 at approximately 3 grams per square meter coating thickness.

The coated film is laminated to a polyethylene film with a solvent lacquer adhesive.

The resulting laminate is clear, shows no mottled effect at the interface of the layers. Processed meat wrapped in the laminar film structure shows an excellent display appearance. A laminate made from a control film similar to control B of Example 1 shows a mottled appearance and is entirely unacceptable for display wrapping of processed meat and similar items. Similar results are obtained with the coating lacquer of this example when the paraffin hydrocarbon wax is omitted from the formula.

What is claimed is:

1. A heat-sealable coating composition for organic film comprising essentially a volatile organic solvent solution of (1) 100 parts by weight of a copolymer of vinylidene chloride and at least one other ethylenically unsaturated monomer copolymerizable therewith, said copolymer containing at least 87% by weight of vinylidene chloride; (2) from 0.5 to 3.0 parts by weight, of a diamide having the formula $R(NCO-R_1)_2$ where R is an alkylene radical selected from the group consisting of methylene and ethylene radicals and $R_1$ is a monovalent radical selected from the group consisting of alkyl and alkenyl radicals having from 10 to 22 carbon atoms; (3) from 0.5 to 3.0 parts by weight of a paraffin hydrocarbon wax having a melting point above 55° C.; and (4) from 0.5 to 2.0 parts by weight of a stearate salt of an alkali metal; and dispersed in said solution from 0.2 to 2.0 parts by weight of a solid particulate material having a particle size in the range of 0.5 to 10 microns.

2. An organic film having a continuous coating of a composition comprising essentially (1) 100 parts by weight of a copolymer of vinylidene chloride and at least one other ethylenically unsaturated monomer copolymerizable therewith, said copolymer containing at least 87% by weight of vinylidene chloride; (2) from 0.5 to 3.0 parts by weight of a diamide having the formula $$R(NCHO-R_1)_2$$

where R is an alkylene radical selected from the group consisting of methylene and ethylene radicals and $R_1$ is a monovalent radical selected from the group consisting of alkyl and alkenyl radicals having from 10 to 22 carbon atoms; (3) from 0.5 to 3.0 parts by weight of a paraffin hydrocarbon wax having a melting point above 55° C.; (4) from 0.5 to 2.0 parts by weight of a stearate salt of an alkali metal; and from 0.2 to 2.0 parts by weight of a solid particulate material having a particle size in the range of 0.5 to 10 microns.

(References on following page)

References Cited

UNITED STATES PATENTS

| | | | |
|---|---|---|---|
| 2,711,996 | 6/1955 | Hofrichter | 260—23 |
| 2,884,392 | 4/1959 | Clark et al. | 260—28.5 |
| 3,165,492 | 1/1965 | Tholstrup et al. | 260—32.6 |
| 3,274,298 | 9/1966 | Massengale et al. | 260—898 |
| 3,340,092 | 9/1967 | Craver et al. | 117—145 |
| 3,375,215 | 3/1968 | Kane | 260—23 |
| 3,419,421 | 12/1968 | Eastes | 117—138.8 |
| 3,428,483 | 2/1969 | Owens | 117—145 |

OTHER REFERENCES

Warth, "The Chemistry and Technology of Waxes," 1956, p. 488.

DONALD E. CZAIA, Primary Examiner

R. A. WHITE, Assistant Examiner

U.S. Cl. X.R.

99—174, 178; 117—145; 161—254; 260—28.5, 32.6, 33.2, 33.6, 41

PO-1050
(5/63)

UNITED STATES PATENT OFFICE
CERTIFICATE OF CORRECTION

Patent No. 3,538,029          Dated November 3, 1970

Inventor(s) Anthony Edward Gross

It is certified that error appears in the above-identified patent and that said Letters Patent are hereby corrected as shown below:

Column 2, line 3, "about" should read -- above --.

Column 2, line 23, "ether" should read -- either --.

Column 2, line 47, "ident" should read -- idene --.

Column 3, line 75, "resin" should read -- rosin --.

Column 4, line 44, "$R(NCO-R_1)_2$" should read -- $R(NHCO-R_1)_2$ --

Column 4, line 63, "$R(NCHO-R_1)_2$" should read
-- $R(NHCO-R_1)_2$ --.

SIGNED AND
SEALED
MAR 2 1971

(SEAL)
Attest:

Edward M. Fletcher, Jr.
Attesting Officer

WILLIAM E. SCHUYLER, JR.
Commissioner of Patents